(12) United States Patent
Fahland et al.

(10) Patent No.: US 9,714,058 B2
(45) Date of Patent: Jul. 25, 2017

(54) ACTIVELY CONTROLLED SPOILER FOR A MOTOR VEHICLE

(71) Applicant: GM GLOBAL TECHNOLOGY OPERATIONS LLC, Detroit, MI (US)

(72) Inventors: Jason D. Fahland, Fenton, MI (US); Joshua R. Auden, Brighton, MI (US); David Dominguez, Tucson, AZ (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/959,888

(22) Filed: Dec. 4, 2015

(65) Prior Publication Data

US 2017/0158257 A1   Jun. 8, 2017

(51) Int. Cl.
*B62D 35/02* (2006.01)
*B62D 35/00* (2006.01)

(52) U.S. Cl.
CPC ........... *B62D 35/005* (2013.01); *B62D 35/02* (2013.01)

(58) Field of Classification Search
CPC ...... B62D 35/00; B62D 35/005; B62D 35/02; B60K 11/04; B60K 11/08
See application file for complete search history.

(56) References Cited

U.S. PATENT DOCUMENTS

| | | | | |
|---|---|---|---|---|
| 2,036,560 A | * | 4/1936 | Backus | B62D 35/005 180/68.1 |
| 2,783,978 A | * | 3/1957 | Baumgarten | B62D 25/105 123/41.04 |
| 3,618,998 A | * | 11/1971 | Swauger | B62D 35/005 280/762 |
| 4,159,140 A | * | 6/1979 | Chabot | B62D 35/005 105/1.3 |
| 4,457,558 A | * | 7/1984 | Ishikawa | B62D 35/005 123/41.05 |
| 4,489,806 A | * | 12/1984 | Shimomura | B62D 35/005 180/313 |
| 4,904,016 A | * | 2/1990 | Tatsumi | B62D 35/005 293/117 |
| 5,908,217 A | * | 6/1999 | Englar | B62D 37/02 296/180.1 |

(Continued)

FOREIGN PATENT DOCUMENTS

| | | | | |
|---|---|---|---|---|
| DE | 3145258 A1 | * | 5/1983 | ........... B62D 35/005 |
| DE | 4208999 A1 | * | 9/1993 | ............. B62D 35/02 |

(Continued)

*Primary Examiner* — Glenn Dayoan
*Assistant Examiner* — Paul Chenevert
(74) *Attorney, Agent, or Firm* — Quinn IP Law

(57) ABSTRACT

A vehicle includes a vehicle body arranged along a longitudinal axis and having a first vehicle body end configured to face oncoming ambient airflow when the vehicle is in motion relative to a road surface. The vehicle additionally includes a spoiler assembly mounted to the vehicle body. The spoiler assembly includes a spoiler body arranged perpendicular to the longitudinal axis. The spoiler assembly also includes a mechanism configured to vary a position of the spoiler body relative to the first vehicle body end. Such varying of the position of the spoiler body relative to the first vehicle body end is intended to control a movement of the ambient airflow relative to the vehicle body.

18 Claims, 3 Drawing Sheets

(56) References Cited

U.S. PATENT DOCUMENTS

| | | | | |
|---|---|---|---|---|
| 6,079,769 | A * | 6/2000 | Fannin | B62D 35/001 296/180.1 |
| 6,286,893 | B1 * | 9/2001 | Presley | B62D 35/005 296/180.5 |
| 6,575,522 | B2 * | 6/2003 | Borghi | B62D 35/005 296/180.1 |
| 7,118,652 | B2 * | 10/2006 | Mc Knight | B62D 35/00 296/180.1 |
| 7,178,395 | B2 * | 2/2007 | Browne | B62D 35/005 244/201 |
| 7,441,615 | B2 * | 10/2008 | Borroni-Bird | B60G 3/18 180/402 |
| 8,646,552 | B2 * | 2/2014 | Evans | B60K 11/085 180/68.1 |
| 9,150,261 | B2 * | 10/2015 | DeAngelis | B62D 35/02 |
| 9,381,957 | B1 * | 7/2016 | Auden | B62D 35/007 |
| 2003/0090126 | A1 * | 5/2003 | Adams | B62D 35/007 296/180.1 |
| 2017/0080770 | A1 * | 3/2017 | Irwin | B60G 17/0165 |
| 2017/0080987 | A1 * | 3/2017 | Morgan | B62D 37/02 |
| 2017/0088200 | A1 * | 3/2017 | Heil | B62D 35/005 |

FOREIGN PATENT DOCUMENTS

| | | | | |
|---|---|---|---|---|
| DE | 10102633 A1 | * | 8/2002 | B62D 35/005 |
| DE | 102008004311 A1 | * | 7/2009 | B62D 35/005 |
| DE | 102008011178 A1 | * | 8/2009 | B62D 35/005 |
| DE | 102011001286 A1 | * | 9/2012 | B62D 35/005 |
| DE | 102011085933 A1 | * | 5/2013 | B62D 35/02 |
| DE | 102012023586 A1 | * | 7/2013 | B60J 7/22 |
| DE | 102013003848 A1 | * | 9/2013 | B62D 35/005 |
| EP | 0165094 A1 | * | 12/1985 | B62D 35/00 |
| EP | 3006249 A1 | * | 4/2016 | B62D 35/02 |
| FR | 2880324 A1 | * | 7/2006 | B62D 35/02 |
| JP | 2016210204 A | * | 12/2016 | B62D 35/007 |
| WO | WO 2015191711 A2 | * | 12/2015 | B62D 35/005 |

* cited by examiner

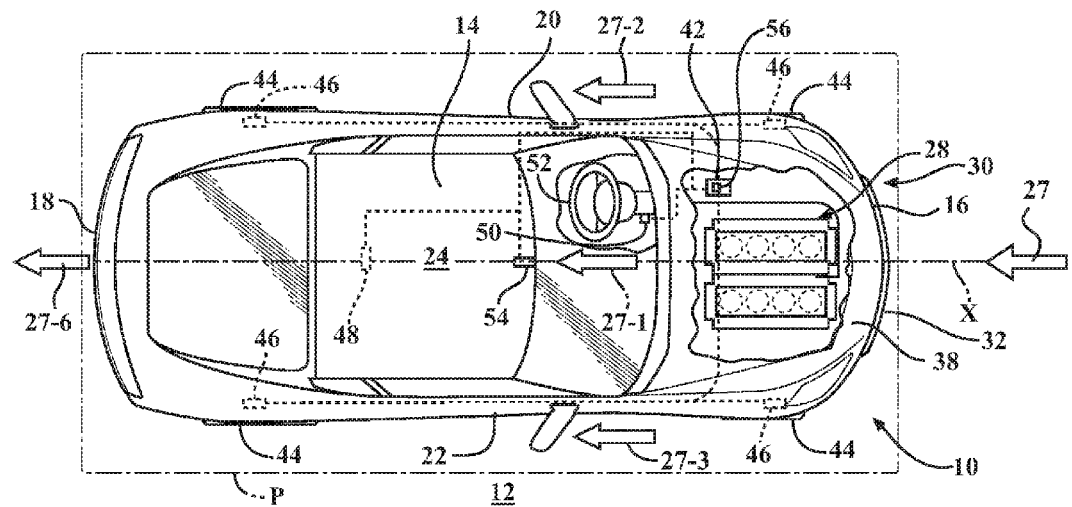
FIG. 1
FIG. 2
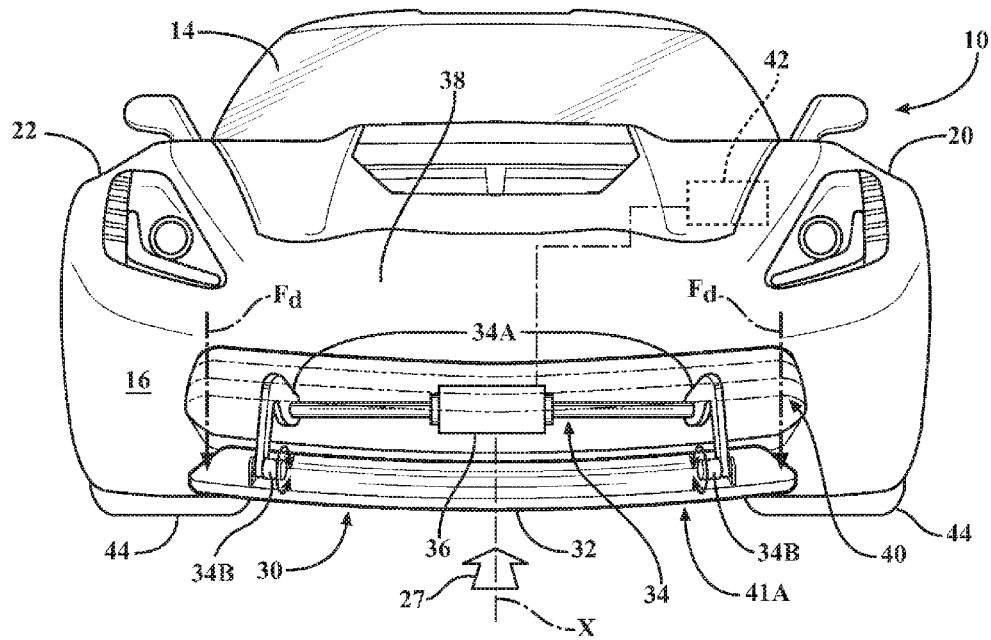

ACTIVELY CONTROLLED SPOILER FOR A MOTOR VEHICLE

TECHNICAL FIELD

The disclosure relates to an actively controlled spoiler for enhancement of aerodynamics of a motor vehicle.

BACKGROUND

Automotive aerodynamics is the study of aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction, high speed stability, and cornering. The study is typically used to shape vehicle bodywork along with employing dedicated aerodynamic devices for achieving a desired compromise among the above characteristics for specific vehicle use.

A spoiler is an automotive aerodynamic device intended to "spoil" unfavorable air movement across a body of a vehicle in motion, usually described as turbulence or drag. Spoilers can be fitted at the front and/or at the rear of the vehicle body. Spoilers on the front of a vehicle are often called air dams. When the vehicle is in motion, in addition to directing air flow, such air dams also reduce the amount of air flowing underneath the vehicle which generally reduces aerodynamic lift and drag.

Additionally, when the vehicle is in motion, the flow of air at the rear of the vehicle becomes turbulent and a low-pressure zone is created, increasing drag and instability. Adding a spoiler at the rear of the vehicle body can help to delay flow separation from the body and a higher pressure zone created in front of the spoiler can help reduce lift on the vehicle body by creating downforce. As a result, in certain instances aerodynamic drag can be reduced and high speed stability will generally be increased due to the reduced rear lift.

SUMMARY

A vehicle includes a vehicle body arranged along a longitudinal axis and having a first vehicle body end configured to face oncoming ambient airflow when the vehicle is in motion relative to a road surface. The vehicle additionally includes a spoiler assembly mounted to the vehicle body. The spoiler assembly includes a spoiler body arranged perpendicular to the longitudinal axis. The spoiler assembly also includes a mechanism configured to vary a position of the spoiler body relative to the first vehicle body end. Such varying of the position of the spoiler body relative to the first vehicle body end is intended to control a movement of the ambient airflow relative to the vehicle body.

The first vehicle body end may include a fascia that defines a grille opening. The mechanism may be configured to retract the spoiler body out of the ambient airflow and into a position within the grille opening to thereby decrease a downforce acting on the first vehicle body end.

The mechanism may also be configured to deploy the spoiler body out of the grille opening and into a position within the oncoming ambient airflow ahead of the first vehicle body end. Such deployment of the spoiler body is intended to increase the downforce acting on the first vehicle body end.

The vehicle may also include a controller configured to regulate the mechanism and thereby vary the position of the spoiler body relative to the first vehicle body end.

The vehicle may additionally include a road wheel and a first sensor configured to detect a rotating speed of the road wheel and communicate the detected rotating speed of the road wheel to the controller.

The vehicle may also include a second sensor configured to detect a yaw rate of the vehicle body and communicate the detected yaw rate to the controller. The vehicle may further include a steering wheel configured to control a direction of the vehicle via a steering wheel angle and a third sensor configured to detect the steering wheel angle and communicate the detected steering wheel angle to the controller.

The controller may be configured to regulate the mechanism to selectively deploy the spoiler body into ambient airflow and retract the spoiler body out of the ambient airflow in response to the detected yaw rate, steering wheel angle, and rotating speed of the road wheel.

By regulating the mechanism, the controller may shift the spoiler body to the position within the oncoming ambient airflow ahead of the first vehicle body end to thereby increase the downforce and reduce the detected yaw rate. Additionally, by regulating the mechanism, the controller may shift the spoiler body to the position within the grille opening to decrease the downforce and aerodynamic drag on the vehicle body, and increase the detected yaw rate.

The mechanism may include an actuator, for example a hydraulic, mechanical, or electro-mechanical device, configured to vary the position of the spoiler body relative to the first vehicle body end.

The spoiler body may have a wing, i.e., an airfoil, shape when viewed in a cross-sectional view.

The mechanism may additionally be configured to tilt or rotate the spoiler body within the grille opening to thereby variably restrict the grille opening and vary an amount of ambient airflow entering the grille opening. Accordingly, the mechanism may include a gear-train and other force transmitting arrangements configured to tilt or rotate the spoiler body.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 1 is a schematic top view of a vehicle having vehicle body arranged in a body plane and along a longitudinal axis, and having a spoiler assembly according to the disclosure.

FIG. 2 is a schematic front view of the vehicle with the spoiler assembly in a deployed position according to the disclosure.

DETAILED DESCRIPTION

Figure 3:
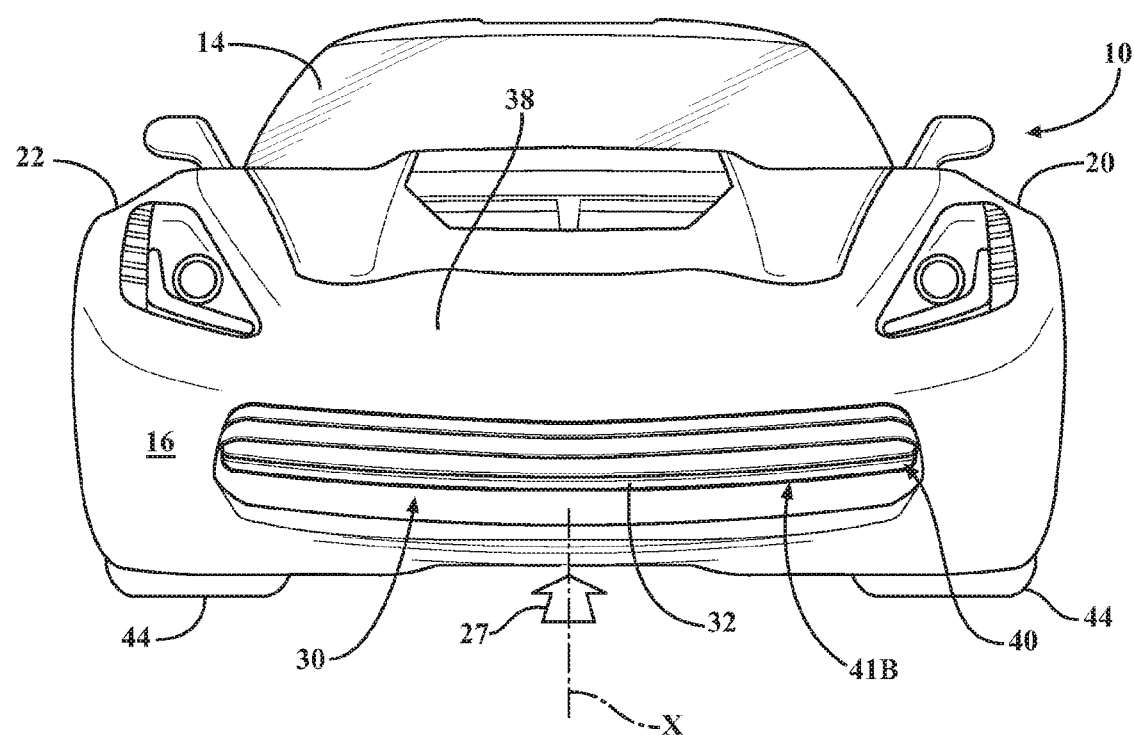
FIG. 3 is a schematic front view of the vehicle with the spoiler assembly in a retracted position according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26 (shown in FIGS. 4-5).

The left side 20 and right side 22 are disposed generally parallel to each other and with respect to the longitudinal axis X, and span the distance between the front end 16 and the rear end 18. The body plane P is defined to include the longitudinal axis X. A passenger compartment (not shown) of the vehicle 10 is generally bounded by the front and rear ends 16, 18 and the left and right sides 20, 22 of the body 14. As understood by those skilled in the art, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As shown, the vehicle 10 also includes a powerplant 28, such as an internal combustion engine, a hybrid-electric powertrain (not shown), or other alternative types of propulsion systems. As the vehicle 10 moves relative to the road surface 12, for example under torque input from the powerplant 28, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, the second airflow portion 27-2 passes over the left side 20, the third airflow portion 27-3 passes over the right side 22, and the fourth airflow portion 27-4 (shown in FIGS. 4-5) passes under the vehicle body 14, between the underbody portion 26 and the road surface 12. As understood by those skilled in the art, the recirculating airflow region 27-6 is generally caused at elevated vehicle speeds by the flow of surrounding air around the six body sides of the vehicle body 14.

As shown in FIGS. 1 and 2, the vehicle 10 also includes a spoiler assembly 30 mounted to the vehicle body 14. The spoiler assembly 30 includes a spoiler body 32 arranged generally perpendicular to the longitudinal axis X. The spoiler body 32 may be wing-shaped. "Wing-shaped" is herein defined as having a shape of a wing, i.e., a fin having a shape of an airfoil. In a cross-sectional view of the spoiler body 32, as seen in a side view of the vehicle 10 shown in FIGS. 4 and 5, the subject airfoil is identified via numeral 32A and is defined by a streamlined shape producing lift for flight or propulsion through a fluid. As shown in FIG. 2, the spoiler assembly 30 also includes a mechanism 34 configured to vary a position of the spoiler body 32 relative to the front end 16 to thereby control a movement of the ambient airflow 27 relative to the vehicle body. In other words, the mechanism 34 is configured to selectively deploy the spoiler body 32 into and retract the spoiler body out of the ambient airflow 27. The mechanism 34 may include one or more actuators 36 configured to vary the position of the spoiler body 32 relative to the front end 16. Such an actuator 36 can operate on an electro-mechanical principle, for example an electric motor, or can be hydraulic or mechanical in nature.

Figure 4:
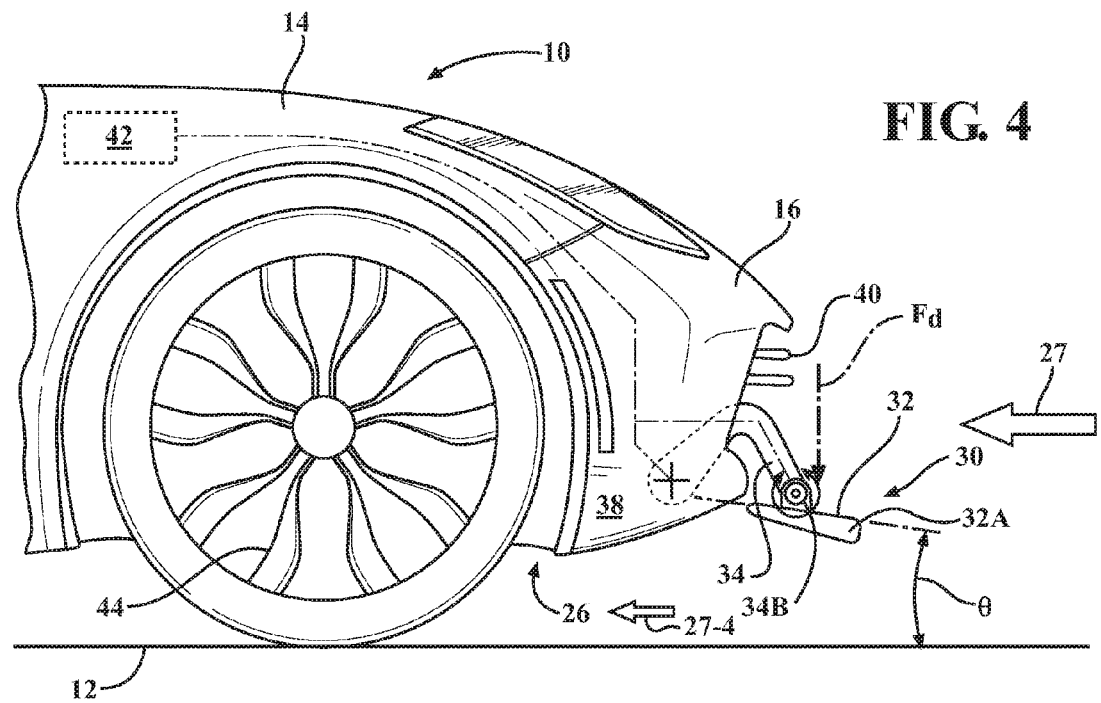
FIG. 4 is a schematic partial side view of the vehicle with the spoiler assembly in the deployed position according to the disclosure.
Figure 5:
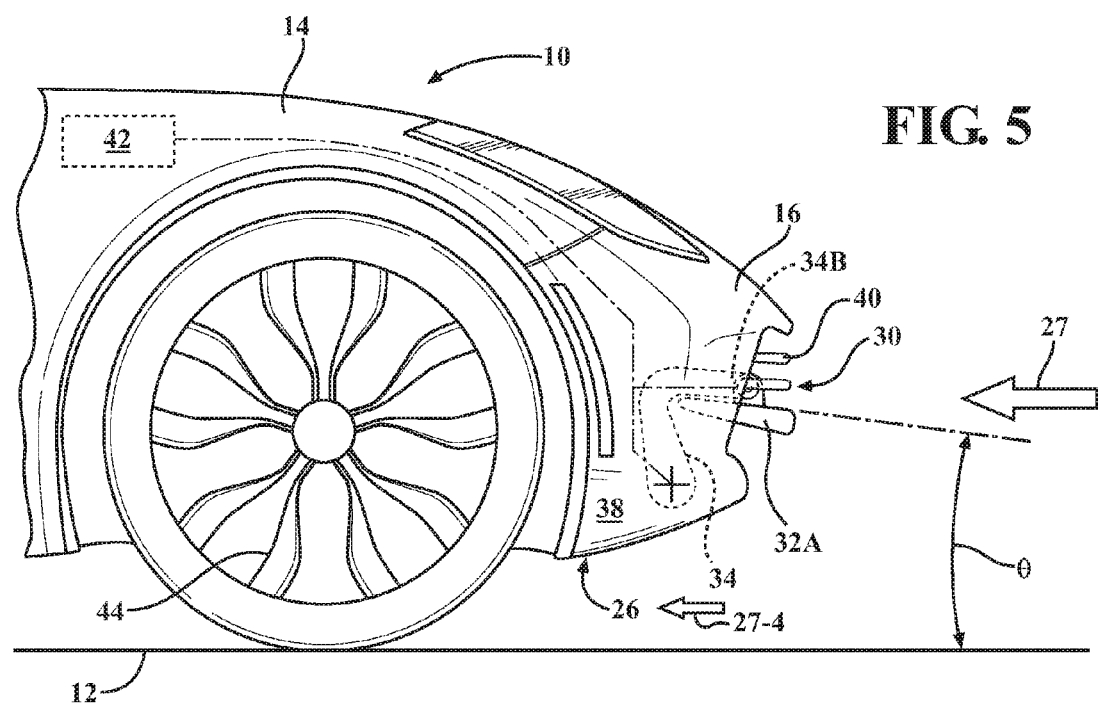
FIG. 5 is a schematic partial side view of the vehicle with the spoiler assembly in a retracted position according to the disclosure.

As shown in FIGS. 2 and 3, the front end 16 includes a fascia 38. The fascia 38 defines a grille opening 40. The mechanism 34 is configured to deploy the spoiler body 32 out of the grille opening 40 and into a position 41A within the oncoming ambient airflow 27 ahead of the front end 16 to thereby increase the downforce $F_d$ acting on the front end of the vehicle 10. The mechanism 34 is also configured to retract the spoiler body 32 out of the ambient airflow 27 and into a position 41B within the grille opening 40 to thereby decrease a downforce $F_d$ acting on the front end 16 of the vehicle 10. The mechanism 34 may be additionally configured to tilt or rotate the spoiler body 32 within the grille opening 40 to thereby variably restrict the grille opening and vary an amount of ambient airflow 27 entering the grille opening. To affect the desired tilting or rotation of the spoiler body 32 within the grille opening 40, as shown in FIGS. 3 and 4, the mechanism 34 may additionally include a cam/lever transmission 34A and one or more motors 34B, and/or other force transmitting arrangements. Furthermore, when the spoiler body 32 is in the deployed state, the mechanism 34 may be configured to tilt or rotate the spoiler body relative to the vehicle body 14 and the road surface 12 to thereby vary the amount of downforce $F_d$ acting on the front end 16.

The vehicle 10 also includes an electronic controller 42 configured, i.e., constructed and programmed, to regulate the mechanism 34 and thereby vary the position of the spoiler body 32 relative to the front end 16. The controller 42 may be configured as a central processing unit (CPU) configured to regulate operation of the powerplant 28, as well as other vehicle systems, or a dedicated controller. In order to appropriately control operation of the mechanism 34, the controller 42 includes a memory, at least some of which is tangible and non-transitory. The memory may be any recordable medium that participates in providing computer-readable data or process instructions. Such a medium may take many forms, including but not limited to nonvolatile media and volatile media.

Non-volatile media for the controller 42 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 42 may also include a floppy disk, a flexible disk, hard disk, magnetic tape, any other magnetic medium, a CD-ROM, DVD, any other optical medium, etc. The controller 42 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 42 or accessible thereby may be stored in the memory and automatically executed to provide the required functionality.

The vehicle 10 also includes road wheels 44. As shown in FIG. 1, a plurality of first sensors 46 may be arranged on the vehicle body 14 for detecting rotating speeds of each road wheel 44. Each first sensor 46 may also be configured to communicate the detected rotating speed of the respective road wheel 44 to the controller 42, while the controller may be configured to correlate the data received from the respective first sensors to road speed of the vehicle 10. The vehicle 10 may also include a second sensor 48 (shown in FIG. 1) configured to detect a yaw moment or rate on the vehicle body 14 relative to the road surface 12 and communicate the detected yaw rate to the controller 42. Additionally, the vehicle 10 may include a third sensor 50 operatively connected to a steering wheel 52 (shown in FIG. 1) and configured to detect an angle of the steering wheel during operation of the vehicle. An intended direction of the vehicle 10 may be identified by the steering wheel angle detected by the third sensor 50 and communicated to the controller 42.

As shown in FIG. 1, the vehicle may additionally include a fourth sensor 54 configured to detect a velocity of ambient airflow 27 relative to the vehicle 10. The fourth sensor 54 may be additionally configured to communicate the detected velocity of the ambient airflow to the controller 42 for correlation of the airflow velocity to road speed of the vehicle 10. Such a fourth sensor 54 may, for example, be a pitot tube configured to detect a pressure of the ambient airflow 27 at a specific location relative to the vehicle body 14 and the controller 42 can correlate the measured pressure to airflow velocity.

By regulating the mechanism 34, the controller 42 can shift the spoiler body 32 to the position 41A within the oncoming ambient airflow 27 ahead of the front end 16. Such a position 41A in the ambient airflow 27 is effective in increasing the downforce $F_d$ and thereby increasing the detected yaw rate. Conversely, the controller 42 can regulate the mechanism 34 to shift the spoiler body 32 to the position 41B within the grille opening 40, thereby decreasing the downforce $F_d$ along with the detected yaw rate, with the additional consequence of decreasing the aerodynamic drag on the vehicle body 14. Furthermore, the controller 42 may be configured to vary an angle θ (shown in FIG. 4) of the spoiler body 32 with respect to the road surface 12 in response to the rotating speeds of the road wheels 44 detected via the first sensor 46 and/or the velocity of the ambient airflow 27 detected via the fourth sensor 54. As discussed above, the angle θ of the spoiler body 32 can be varied via the cam/lever transmission 34A and the motor(s) 34B. Accordingly, the angle θ of the spoiler body 32 can be controlled proportionately to the yaw rate generated during cornering of vehicle 10 by selectively operating the mechanism 34. The controller 42 may be programmed with a look-up table 56 establishing correspondence between the vehicle yaw rate, vehicle road speed, and/or velocity of the airflow and the angle θ of the spoiler body 32 for affecting appropriate regulation of the mechanism 34. The look-up table 56 may be developed empirically during validation and testing of the vehicle 10.

The controller 42 may be additionally programmed to determine a slip of the vehicle 10 relative to the road surface 12. The slip of the vehicle 10 may include a measure of how much each of the road wheels 44 has slipped in a direction that is generally perpendicular to the longitudinal vehicle axis X, which identifies that the vehicle has deviated from the intended direction or path along the road surface 12 as identified by the steering wheel angle detected by the third sensor 50. The controller 42 may be programmed to compare the determined steering wheel angle and yaw rate to determine how much the vehicle had deviated from its intended direction or path. The controller 42 may also be programmed to control the slip of the vehicle 10 relative to the road surface 12 by selectively regulating the angle θ of the spoiler body 32 via the mechanism 34 in response to how much the vehicle has deviated from its intended path. The altered the angle θ of the spoiler body 32 relative to the road surface 12 then urges the vehicle 10 to return to the actual vehicle heading to the desired heading being commanded by an operator of the vehicle at the steering wheel 52. Accordingly, as the angle θ of the spoiler body 32 is varied during the cornering event, the spoiler assembly 30 positioned at the front end 16 is able to use the ambient airflow 27 more effectively in order to maximize the downforce $F_d$ at the front end of the vehicle body 14.

According to the above description, regulation of the position of the spoiler body 32 may be employed to maintain contact of the vehicle 10 with the road surface 12 at elevated vehicle speeds by countering aerodynamic lift of the vehicle body 14 at the front end 16 in response to the velocity of ambient airflow 27 detected by the fourth sensor 54. Additionally, regulation of the position of the spoiler body 32 may be employed to aid handling of the vehicle 10 in order to maintain the vehicle on its intended path by countering the yaw moment acting on the vehicle body 14 as detected by the second sensor 48. Accordingly, the controller 42 may be programmed to regulate the mechanism 34 to selectively deploy the spoiler body 32 into ambient airflow 27 and retract the spoiler body out of the ambient airflow in response to the detected yaw rate, steering wheel angle, and rotating speeds of the road wheels 44.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A vehicle comprising:
   a vehicle body arranged along a longitudinal axis and having a first vehicle body end configured to face oncoming ambient airflow when the vehicle is in motion relative to a road surface; and
   a spoiler assembly mounted to the vehicle body and having:
      a spoiler body arranged perpendicular to the longitudinal axis; and
      a mechanism configured to vary a position of the spoiler body relative to the first vehicle body end to thereby control a movement of the ambient airflow relative to the vehicle body;
   wherein:
      the first vehicle body end includes a fascia;
      the fascia defines a grille opening; and
      the mechanism is configured to selectively deploy the spoiler body into the ambient airflow outside the grille opening and retract the spoiler body out of the ambient airflow and into a position within the grille opening to thereby decrease a downforce acting on the first vehicle body end.

2. The vehicle according to claim 1, wherein the mechanism includes an actuator configured to vary the position of the spoiler body relative to the first vehicle body end.

3. The vehicle according to claim 1, wherein the spoiler body has an airfoil-shape in a cross-sectional view.

4. The vehicle according to claim 1, wherein the mechanism is additionally configured to tilt the spoiler body within the grille opening to thereby variably restrict the grille opening and vary an amount of ambient airflow entering the grille opening.

5. The vehicle according to claim 1, wherein the mechanism is configured to deploy the spoiler body out of the grille opening and into a position within the oncoming ambient airflow ahead of the first vehicle body end to thereby increase the downforce acting on the first vehicle body end.

6. The vehicle according to claim 5, further comprising a controller configured to regulate the mechanism and thereby vary the position of the spoiler body relative to the first vehicle body end.

7. The vehicle according to claim 6, further comprising a road wheel and a first sensor configured to detect a rotating speed of the road wheel and communicate the detected rotating speed of the road wheel to the controller.

8. The vehicle according to claim 7, further comprising:
a second sensor configured to detect a yaw rate of the vehicle body and communicate the detected yaw rate to the controller;
a steering wheel configured to control a direction of the vehicle via a steering wheel angle; and
a third sensor configured to detect the steering wheel angle and communicate the detected steering wheel angle to the controller.

9. The vehicle according to claim 8, wherein the controller is configured to regulate the mechanism to selectively deploy the spoiler body into ambient airflow and retract the spoiler body out of the ambient airflow in response to the detected yaw rate, steering wheel angle, and rotating speed of the road wheel.

10. A vehicle comprising:
a vehicle body arranged along a longitudinal axis and having a first vehicle body end configured to face oncoming ambient airflow when the vehicle is in motion relative to a road surface;
a spoiler assembly mounted to the vehicle body and having:
a spoiler body arranged perpendicular to the longitudinal axis; and
a mechanism configured to vary a position of the spoiler body relative to the first vehicle body end to thereby control a movement of the ambient airflow relative to the vehicle body; and
a controller configured to regulate the mechanism;
wherein:
the first vehicle body end includes a fascia;
the fascia defines a grille opening; and
the mechanism is configured to selectively deploy the spoiler body into the ambient airflow outside the grille opening and retract the spoiler body out of the ambient airflow and into a position within the grille opening to thereby decrease a downforce acting on the first vehicle body end.

11. The vehicle according to claim 10, wherein the mechanism includes an actuator configured to vary the position of the spoiler body relative to the first vehicle body end.

12. The vehicle according to claim 10, wherein the spoiler body has an airfoil-shape in a cross-sectional view.

13. The vehicle according to claim 10, wherein the mechanism is additionally configured to tilt the spoiler body within the grille opening to thereby variably restrict the grille opening and vary an amount of ambient airflow entering the grille opening.

14. The vehicle according to claim 10, wherein the mechanism is configured to deploy the spoiler body out of the grille opening and into a position within the oncoming ambient airflow ahead of the first vehicle body end to thereby increase the downforce acting on the first vehicle body end.

15. The vehicle according to claim 14, further comprising a road wheel and a first sensor configured to detect a rotating speed of the road wheel and communicate the detected rotating speed of the road wheel to the controller.

16. The vehicle according to claim 15, further comprising:
a second sensor configured to detect a yaw rate of the vehicle body and communicate the detected yaw rate to the controller;
a steering wheel configured to control a direction of the vehicle via a steering wheel angle; and
a third sensor configured to detect the steering wheel angle and communicate the detected steering wheel angle to the controller.

17. The vehicle according to claim 16, wherein the controller is configured to regulate the mechanism to selectively deploy the spoiler body into ambient airflow and retract the spoiler body out of the ambient airflow in response to the detected yaw rate, steering wheel angle, and rotating speed of the road wheel.

18. The vehicle according to claim 17, wherein, via regulating the mechanism, the controller is configured to:
shift the spoiler body to the position within the oncoming ambient airflow ahead of the first vehicle body end to thereby increase the downforce and reduce the detected yaw rate; and
shift the spoiler body to the position within the grille opening to decrease the downforce and aerodynamic drag on the vehicle body, and increase the detected yaw rate.

* * * * *